United States Patent [19]
Suhr

[11] Patent Number: 5,853,615
[45] Date of Patent: Dec. 29, 1998

[54] FLUORESCENT COVERING FOR ROADS, PARKING AREAS ETC, WHICH FLUORESCES UPON ILLUMINATION WITH ULTRAVIOLET LIGHT

[75] Inventor: Jörn Arne Suhr, Everöd, Sweden

[73] Assignee: Cleanosol International AB, Sweden

[21] Appl. No.: 962,224

[22] Filed: Oct. 31, 1997

Related U.S. Application Data

[63] Continuation of Ser. No. 640,829, Jun. 27, 1996, abandoned which is a continuation of PCT/SE94/01053, Nov. 9, 1994.

[30] Foreign Application Priority Data

Nov. 15, 1993 [SE] Sweden .................................. 9303750

[51] Int. Cl.[6] ................. E01F 9/04; C09D 5/22
[52] U.S. Cl. ................. 252/301.21; 252/301.16; 252/301.35; 106/31.04; 523/172; 427/158
[58] Field of Search ......................... 106/31.04; 427/158; 252/301.35, 301.16, 301.21; 523/172

[56] References Cited

U.S. PATENT DOCUMENTS 4,197,227 4/1980 Zeliger .................................. 427/137

FOREIGN PATENT DOCUMENTS

| 735371 | 5/1966 | Canada ............................. 252/301.21 |
| 466671 | 1/1992 | European Pat. Off. . |
| 3321738 | 12/1984 | Germany ........................... 252/301.21 |
| 90/02226 | 3/1990 | WIPO . |
| 93/18237 | 9/1993 | WIPO . |
| 94/20577 | 9/1994 | WIPO . |

*Primary Examiner*—Melissa Bonner
*Attorney, Agent, or Firm*—Lerner, David, Littenberg, Krumholz & Mentlik

[57] ABSTRACT

The present invention relates to a fluorescent covering for roads, parking areas and the like. The covering has a binder which fluoresces at the same energy as an organic optical whitener, thereby more uniformly dispersing energy and prolonging the life of the whitener.

5 Claims, No Drawings

FLUORESCENT COVERING FOR ROADS, PARKING AREAS ETC, WHICH FLUORESCES UPON ILLUMINATION WITH ULTRAVIOLET LIGHT

This is a continuation of application Ser. No. 08/640,829, filed Jun. 27, 1996, now abandoned, and as described and claimed in Internation application PCT/SE94/01053, filed on Nov. 9, 1994.

TECHNICAL FIELD

The present invention relates to a fluorescent covering for roads, parking areas etc., which fluoresces upon illumination with ultraviolet light and the invention relates particularly to a covering which both fluoresces in strong light, and has a fluorescent life which is longer than that of known coverings.

PRIOR ART

Fluorescent coverings for the aforementioned purpose are known. Besides markings on roads they are also used for coverings of refuges, on edge poles and signs of different kinds. One example of such coverings is disclosed in the U.S. Pat. No. 3,253,146 which describes a road marking composed of glass, pigments and binders. The marking fluoresces upon illumination with UVA light. The binder is transparent and comprises natural resins and glycerol esters. Synthetic resins may also be used, such as glycerol stearates, formalin resins etc.

The Swedish patent 462 109 also describes a fluorescent covering which has been made fluorescent by doping a mineral comprised in the covering with an agent which gives the mineral fluorescent properties. Examples of such agents are fluorites ($CaF_2$) which have been made fluorescent by being doped with manganese (Mn). The binder is said to be tar. GB patent 2 043 673 discloses also a fluorescent composition comprising luminous uranates or organic material. This material is preferably carried by quartz or an aluminium silicate, the surface of which has been made porous or rough by etching and has a high hardness. The binder consists of a mixture of a styrene.or diisocyanate resin. The binder is transparent.

The German patent DE 3 321 738 discloses a similar mixture for the production of reflecting elements for road markings, signs and sport articles. The mixture comprises pigments and organic optical whiteners and the binder consists of a limpid transparent material of different polymers.

TECHNICAL PROBLEM

The above road coverings are unsatisfactory partly due to the fact that the fluorescent materials give too weak a fluorescence, and partly in that they have too short a life. This is particularly the case with optical whiteners which consist of organic compounds which are successively destroyed by UV-irradiation. It has therefore long been a desire to make a covering which both irradiates with desired strength, and has a sufficient life with regard to the fluorescence.

THE SOLUTION

According to the present invention a fluorescent covering for roads, parking areas etc., which fluoresces upon illumination with ultraviolet light and comprises organic optical whiteners and pigments has been achieved, said covering being characterized in that the binder consists of a solid solution of an amorphous polymer mixture having a glass transition temperature of 20°–60° C. and a coefficient of elasticity which is less than 1000 MPa at −10° C. and greater than 1 MPa at +60° C., and which fluoresces upon irradiation with ultraviolet light.

According to the invention the binder comprises a fluorescent hydrocarbon resin which fluoresces with a white to yellow-white colour.

According to the invention, the binder suitably comprises about 15 weight parts of hydrocarbon resins, about 5 weight parts of low molecular hydrocarbons, about 3 weight parts of block copolymers and about 2 weight parts of olefine copolymers.

Further, the covering according to the invention may comprise about 10 weight parts of zinc-white, about 5 weight parts of titanium dioxide, 25 weight parts of binder, about 1 weight part of optical whitener, about 20 weight parts of glass pearls and about 39 weight parts of reinforcement agents.

The optical whitener and the binder according to the invention should fluoresce within the wave length range of 400–500 nm upon irradiation with ultraviolet light having a wave length of 320–400 nm.

The binder according to the invention accordingly consists of a solid solution of an amorphous polymer mixture which, at its functioning temperature, make brownian molecule motions and thereby can steadily expose its content of organic optical whiteners for irradiation by ultraviolet light without destruction of the organic optical whiteners.

In the organic optical whitener the energy absorption occurs in the separate molecules when the optical whitener is subjected to ultraviolet irradiation. The energy absorbed is quickly released in the form of a short wave visible light.

If the optical whitener is present in a non-coloured liquid it can be exposed without any hindrance to the ultraviolet light. This means that the organic optical whitener, when absorbing energy and releasing energy, can release a maximal amount of short wave visible light or maximal fluorescence effect. However, a part of the energy absorbed may be used by the molecule vibrations and molecule rotations due to the fact that the molecules of the organic optical whitener have great freedom of movement in the liquid.

In a solid polymer solution the organic optical whitener has the same possibility of absorbing energy by being irradiated with ultraviolet light and dissipating energy in the form of short wave white light as fluorescence. The freedom of movement however is lowered for the molecule of the organic optical whitener and hence the possibility of internal energy losses of the organic optical whitener.

By composing a binder in the form of a solid solution of an organic optical whitener, its ability to fluoresce can be raised.

By choosing components for the solid solution so that the solution itself consumes parts of the same irradiation energy from ultraviolet light as the organic optical whitener, the energy intensity can be controlled in such a way that the life which is desirable for the function of an organic optical whitener can be obtained in a covering according to the present invention. Thus the irradiation energy towards the optical whitener is lowered and its life is thereby extended.

An important component of the binder which brings about this damping of the irradiation energy towards the whitener and which itself fluoresces can be a hydrocarbon resin which is fluorescent and is chosen so that it thereby consumes a suitable part of the ultraviolet irradiation energy.

In the binder for the covering, also other substances may also be present provided that the binder still consists of an amorphous polymer mixture.

The binder according to the invention may consist of selected hydrocarbon resins, hydrocarbon mixtures, block copolymers and olefine copolymers so that the binder has a glass transition temperature of between +20° C. and +60° C. and has a coeffcient of elasticity which is less than 1000 MPa at −10° C. and greater than 1 MPa at +60° C.

PREFERRED EMBODIMENTS

An example of an embodiment of the binder according to the invention comprises:

| | |
|---|---|
| Hydrocarbon resins | 15 weight parts |
| Low molecular hydrocarbons | 5 weight parts |
| Block copolymers | 3 weight parts |
| Olefine polymers | 2 weight parts |

As an example of one embodiment the following more concrete compositions can be used:

| | |
|---|---|
| Escorez 1102 RM, Exxon, France | 13 weight parts |
| Flexon 876, Exxon, France | 3, 5 weight parts |
| Cariflex 1107, Shell, Great Britain | 2, 5 weight parts |
| Polybilt 100, Exxon, USA | 3 weight parts |
| Piccopale 100, Hercules, USA | 14 weight parts |
| Omnis 68, Texaco, Sweden (low molecular hydrocarbons = a mixture of paraffins, naphtenes and aromatic oils) | |
| Vector 4111D, Dexco, USA | 1, 8 weight parts |
| Polybilt 100, Exxon, USA | 2, 5 weight parts |

Hydrocarbon resin which in the two later examples is exemplified by Escorez 1102 RM and Piccopale 1.00 is a common term for resins having C5 and C9 hydrocarbons as a base. Typical molecule structures for aliphatic diolefines like C5 hydrocarbons in a hydrocarbon resin consist of

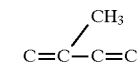

isoprene

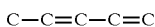

piperylene

cyclopentadiene

An example of one C5-resin is Escorez 1102 RM from Exxon Chemical. It has a softening point according to ASTM E28 of approximately 100° C.

The C9-resin has aromatic mono-olefines as a base and hence a different molecular structure which is apparent from the following type examples:

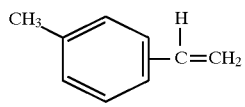

vinyltoluene

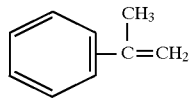

α-methylstyrene

Escorez 5300 from Exxon Chemical is an example of a C9-resin. It has a softening point according to ASTM E28 of approximately 105° C.

Among low molecular hydrocarbons, a mixture of highly refined mineral oils, which is a mixture of relatively low molecular saturated hydrocarbons, can be used. Such a mixture may consist of 45–55% paraffine, 35–45% naphtenes mixture may consist of 45–55% paraffine, 35–45% naphtenes and 5–10% aromatics. An example of such a hydrocarbon mixture is Flexon 876 from Exxon Chemical. It has a density according to ASTM D1298 of 860 kg/m³.

Block copolymers comprise material types which are also termed thermoelastics and thermoplastic rubber. Examples of block copolymers are three-block copolymers such as styrene-butadiene-styrene and styrene-isoprene-styrene. It is characteristic that the segments br blocks are not compatible and that the styrene segments can be joined for example by a melting process and the block copolymer can build a macro-molecular network in a polymer mixture. The isoprene segments can be softened by taking up large amounts of the low molecular hydrocarbon mixture without being dissolved and loosing their elastic properties. An example of a styrene-isoprene-styrene block copolymer which can be used according to the invention is Vectro 4111D from Dexco Polymers and Cariflex 1107 from Shell Chemicals. A typical content of styrene is 15–18% and the hardness according to ASTM D2240 is 35–40 Shore A.

Olefine copolymers are a common term for polymers which have an olefine from their petro chemistry as a basic component. An example of one olefine copolymer is a copolymerisate of ethylene and vinyl acetate. Such a polymer is Polybilt 100 from Exxon Chemical. The softening point according to ASTM E28 for this is approximately 87° C. and the melting index according to ASTM D1238 is approximately 2.070 g in 10 minutes.

In these embodiments the binder of the covering exhibits micro-brownic movements at temperatures which are lower than the glass transition temperature of the covering.

The most important feature of the present invention is the composition of the binder. This will however be only a part of the covering, at the lowest 20% by weight. Other substances in the covering are pigments, reinforcing and friction materials, glass pearls and, above all, optical whiteners.

The pigment is suitably a white pigment which makes the covering so white that it can cover a black substrate when the covering has a smallest thickness of 0,4 mm. Examples of white pigments are titanium dioxide and zinc-white. The titanium dioxide may, for example, consist of Anatase Titanium Dioxide All from Tytan Pol Police, Poland and 1002 Kronos Titan A/S, Norway. Examples of zinc oxide are Zinkvitt, Vitt Sigill from Rånäs Bruks Aktiebolag, Sweden and from Grillo Zincoxid, GmbH, Germany.

Reinforcing and friction materials may be present in the form of mineral powders having a grain-size curve between 0,001 mm and 1 mm. Examples thereof are chalk, dolomite, silicate and quartz sand, for example Myanit and Mikrodol from Ernström, Luxovit from Superfoss and sea-sand from Gammalstorp.

The covering also comprises spherical non-coloured glass pearls for the covering's function as a reflecting covering upon illumination with visible light in darkness. Such reflecting pearls are non-coloured spherical glass pearls having a reflection index of at least 1,5 and a roundness percentage of at least 80% and a grain-size curve of 0,2 mm to 0,8 mm. Such glass pearls may be obtained from Potters, Unibeads, Glaverbel and Swarco.

The organic optical whiteners suitably consist of derivates of Stilben, Cumarin, Pyrazolin, Naftalimid and Bensoxazol.

Suitable organic optical whiteners can further be exemplified by 1,4-distyrylbenzene, 2-(4-styrylphenyl)-5-phenyl-oxazol, 2,2-(2,5-thiophendiyl)-bis(5-(1,1-dimethylethyl))-benzoxazole, 1,4-bis(5-phenyloxazolyle-2)-benzene and 5,6-bensocumarin-3-carboxyl acid ethyl ester.

These optical whiteners have the ability to absorb energy to a maximum within the wave length range 320–400 nm, (UVA illumination) and emit a corresponding amount of energy in the form of visible white to blue-white light within the wave length range of 400–500 nm. The amount of organic optical whiteners, can according to the invention, be 0,1–1 weight % of the covering. Examples of organic optical whiteners which can be used according to the invention are Uvitex OB from Ciba and Optiblanc from Sigma Chemicals, Italy.

One example of one embodiment of the total covering comprises:

| | |
|---|---|
| Zinc-white | 10 weight parts |
| Titanium dioxide | 5 weight parts |
| Binder | 25 weight parts |
| Optical whitener | 1 weight parts |
| Glass pearls | 20 weight parts |
| Reinforcing and friction agents | 39 weight parts |

More concretely the following two compositions may be mentioned:

| | |
|---|---|
| Grillo zinc-white vitt sigill | 12 weight parts |
| Kronos 1002 (Titanium dioxide anatase) | 4 weight parts |
| Binder according to described embodiments | 21 weight parts |
| Uvitex OB (optical whitener from Ciba) | 0, 8 weight parts |
| Potters premix 0, 8–0, 8 mm (glass pearls) | 21 weight parts |
| *Luxovit 0, 5–1 mm, white quarts | 18 weight parts |
| *Myanite 0–70 mym, Ca—Mg Carbonate | 14 weight parts |
| *Gammalstorpsand 0, 3 mm, Sjösand | 9, 2 weight parts |
| Rånäs zinc-white vitt sigill | 14 weight parts |
| Titanium dioxide A11 | 2 weight parts |
| Binder according to described embodiments | 23 weight parts |
| Optiblanc, optical whitener from Sigma | 0, 4 weight parts |
| Swarco premix 0, 4–0, 6 mm (glass pearls) | 18 weight parts |
| *Luxovit 0, 5–1 mm, white quartz | 7 weight parts |
| *Mikrodaol 325, Ca—Mg Carbonate | 16 weight parts |
| *Dansand 0, 4 mm, Sjösand | 19, 6 weight parts |

*Reinforcing and friction agents.

The invention is not limited to the above mentioned embodiments but may be modified in different ways within the scope of the claims.

I claim:

1. A fluorescent covering composition for roads and parking areas comprising: an organic optical whitener, a pigment and a binder said binder comprising a solid solution of an amorphous polymer mixture including at least one hydrocarbon resin which fluoresces with a white to yellow-white colour, said binder having a glass transition temperature of 20° C. to 60° C. and a coefficient of elasticity which is less than 1000 MPa at −10° C. and greater than 1 MPa at +60° C. and which fluoresces upon illumination with ultraviolet light and wherein said composition included about 10 parts of zinc-white by weight and about 5 parts of titanium dioxide by weight, and wherein said binder is provided in an amount of about 25 parts by weight, said organic optical whitener is provided in an amount of about 1 part by weight, glass pearls are provided in an amount of about 20 parts by weight and a reinforcing agent is provided in an amount of about 39 parts by weight.

2. A fluorescent covering composition for roads and parking areas comprising: an organic optical whitener, a pigment and a binder said binder comprising a solid solution of an amorphous polymer mixture including at least one hydrocarbon resin which fluoresces with a white to yellow-white colour, said binder having a glass transition temperature of 20° C. to 60° C. and a coefficient of elasticity which is less than 1000 MPa at −10° C. and greater than 1 MPa at +60° C. and fluorescing upon illumination with ultraviolet light, wherein said binder includes about 15 parts of a hydrocarbon resin by weight, about 5 parts by weight of a low molecular weight hydrocarbon, about 3 parts of a block copolymer by weight and about 2 parts of an olefine copolymner by weight.

3. A fluorescent covering composition for roads and parking areas comprising: an organic optical whitener, a pigment and a binder said binder comprising a solid solution of an amorphous polymer mixture including at least one hydrocarbon resin which fluoresces with a white to yellow-white colour, said binder having a glass transition temperature of 20° C. to 60° C. and a coefficient of elasticity which is less than 1000 MPa at −10° C. and greater than 1 MPa at +60° C. and fluorescing upon illumination with ultraviolet light, and, wherein said binder includes about 15 parts of a hydrocarbon resin by weight, about 5 parts by weight of a low molecular weight hydrocarbon, about 3 parts of a block copolymer by weight and about 2 parts of an olefine copolyner by weight; and wherein said organic optical whitener and said binder fluoresce within a wave length range of 400–500 NM upon illumination with ultraviolet light having a wave length of 320–400 NM.

4. A fluorescent covering composition for roads and parking areas comprising: an organic optical whitener, a pigment and a binder said binder comprising a solid solution of an amorphous polymer mixture including at least one hydrocarbon resin which fluoresces with a white to yellow-white colour, said binder having a glass transition temperature of 20° C. to 60° C. and a coefficient of elasticity which is less than 1000 MPa at −10° C. and greater than 1 MPa at +60° C. and fluorescing upon illumnination with ultraviolet light, and; wherein said binder includes about 15 parts of a hydrocarbon resin by weight, about 5 parts by weight of a low molecular weight hydrocarbon, about 3 parts of a block copolymer by weight and about 2 parts of an olefine copolymer by weight, wherein said organic optical whitener and said binder fluoresce within a wave length range of 400–500 NM upon illumination with ultraviolet light having a wave length of 320–400 NM, and wherein said pigment includes about 10 parts of zinc-white by weight and about 5 parts of titanium dioxide by weight, and wherein said binder is provided in an amount of about 25 parts by weight, said organic optical whitener is provided in an amount of about 1 part by weight, glass pearls are provided in an amount of about 20 parts by weight and a reinforcing agent is provided in an amount of about 39 parts by weight.

5. A fluorescent covering composition for roads and parking areas comprising: an organic optical whitener, a pigment and a binder said binder comprising a solid solution of an amorphous polymer mixture including at least one hydrocarbon resin which fluoresces with a white to white-yellow colour, said binder having a glass transition temperature of 20° C. to 60° C. and a coefficient of elasticity which is less than 1000 MPa at −10° C. and greater than 1 MPa at +60° C. and wherein said fluorescent covering composition including said organic optical whitener and said binder fluoresce within a wave length range of 400–500 NM upon illumination with ultraviolet light having a wave length of 320–400 NM.

* * * * *

UNITED STATES PATENT AND TRADEMARK OFFICE
CERTIFICATE OF CORRECTION

PATENT NO. : 5,853,615
DATED : December 29, 1998
INVENTOR(S) : Suhr

It is certified that error appears in the above-identified patent and that said Letters Patent is hereby corrected as shown below:

Column 3, line 35, above "1,8 weight parts" insert --4.2 weight parts--.

Column 4, line 8, "vinyltoluene" should read --Vinyltoluene--.

Column 4, lines 22, 23, delete "mixture may consist of 45-55% paraffine, 35-45% naphtenes".

Column 4, line 31, "br" should read --or--.

Signed and Sealed this

Tenth Day of August, 1999

Attest:

Q. TODD DICKINSON

*Attesting Officer*     Acting Commissioner of Patents and Trademarks